UNITED STATES PATENT OFFICE.

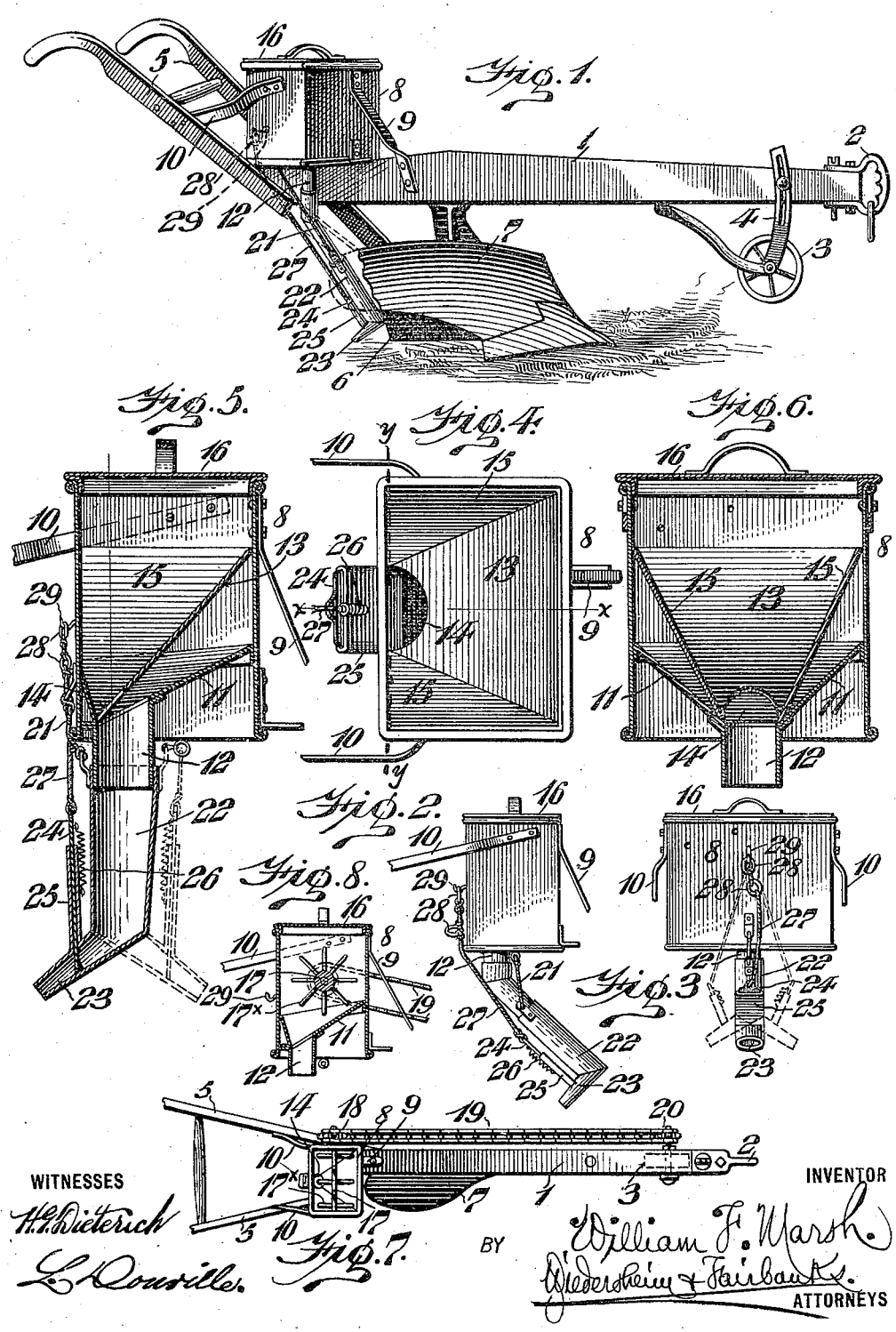

WILLIAM F. MARSH, OF MALAGA, NEW JERSEY.

FERTILIZER-DRILL ATTACHMENT TO CULTIVATORS AND PLOWS.

987,388.　　　　　　Specification of Letters Patent.　　Patented Mar. 21, 1911.

Application filed October 13, 1910.　Serial No. 586,842.

*To all whom it may concern:*

Be it known that I, WILLIAM F. MARSH, a citizen of the United States, residing at Malaga, in the county of Gloucester, State of New Jersey, have invented a new and useful Fertilizer-Drill Attachment to Cultivators and Plows, of which the following is a specification.

My invention consists of a fertilizer attachment adapted to be applied to a plow, cultivator, or similar implement to deposit fertilizer in furrows and rows.

It further consists of such an attachment in which the direction of delivery of the fertilizer may be adjusted.

It further consists of such an attachment in which the fertilizer is freely fed to the delivery spout and prevented from packing so as to either choke the spout or bridge in the hopper, that is, pack or collect over the opening into the spout and thus prevent the contents of the hopper entering the spout.

It further consists of other novel features of construction, all as will be hereinafter fully set forth.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a plow provided with my improved attachment. Fig. 2 represents a side elevation of the attachment. Fig. 3 represents a front elevation of the attachment. Fig. 4 represents a plan view of the hopper of my attachment. Fig. 5 represents a vertical section of the attachment on the line $x$—$x$ in Fig. 4, and illustrating a slightly different form of spout. Fig. 6 represents a vertical section at right angles to the section of Fig. 5, and on the line $y$—$y$ in Fig. 4. Fig. 7 represents a top plan view of a plow provided with my attachment constructed with a stirring device in the hopper. Fig. 8 represents a vertical section of the latter form of hopper.

Similar numerals of reference indicate corresponding parts in the figures.

Referring to the drawings:—my attachment may be employed in connection with a plow or with a one-horse cultivator or similar implement, and in the drawings the device is illustrated as applied to a plow having a beam 1, which forms the frame for the implement and is provided with a clevis 2, and a guide wheel or gage-wheel 3, journaled to have vertically adjustable support in a slotted segmental bracket 4, at the forward end of the beam. Handles 5 are connected to the plow, and in the illustrated form of implement, the plow has a landside 6, and a mold-board 7. A hopper 8 is secured upon the rear portion of the beam and braced to the latter and to the handles by braces 9 and 10 respectively. The hopper has a convergingly inclined bottom 11, converging to a neck 12, and a false hopper is fitted within the outer hopper, having a side 13, inclined from near the upper edge of the front side of the hopper to the lower edge of the rear side of the same, where it has an opening 14, down into the neck, and sides 15, converge with the forward side to said opening, this hopper having thus a nearly vertical rear side, converging lateral sides, and a nearly diagonal front side. The top of the hopper is closed by a removable cover 16. By thus providing a hopper with three sides converging to the lower edge of a fourth, substantially vertical side, the fertilizer will freely slide toward the discharge opening without the upper portion of the finely pulverized fertilizer packing or bridging after the lower portion thereof has run out through the discharge opening, as is liable to happen in a hopper having vertical sides and a convergingly inclined bottom.

When the outer hopper is used without the false hopper, a stirrer is employed, consisting of a shaft 17, transversely journaled in the hopper and provided with radially projecting stirring fingers $17^x$, as illustrated in Figs. 7 and 8. A chain wheel 18 is secured upon one end of the shaft, outside of the hopper, and a chain 19 passes around such wheel and around a similar wheel 20, upon the shaft of the guide wheel 3, so that the stirrer will be revolved when the plow is propelled.

A spout is fitted to swivel upon the neck 12, and consists of an elbow 21, fitting upon the neck, and a pipe 22 fitted to swivel upon the end of said elbow and having a nozzle 23, bent at an angle to the pipe and provided with a gate 24, guided in a tubular guide 25, to transversely intersect the passage through the nozzle to adjustably control the flow of fertilizer through the same. A spring 26, serves to draw the gate into the passage in the nozzle, and the gate may be drawn out by means of a cord or chain 27, having rings 28 engaging a hook 29, upon the hopper or the frame of the plow, to adjustably hold the gate more or less opened or closed.

In the form illustrated in Fig. 5 of the drawings, the elbow of the spout is dispensed with and the pipe 22 is directly fitted to swivel upon the neck to depend vertically.

When the hopper is adjusted upon the beam or frame of the plow, shovel plow, cultivator or whatever similar implement it is used in connection with, the nozzle may be pointed forward, rearward or laterally, according to requirements, by turning the pipe of the nozzle upon the neck, or upon the elbow, where the latter is used. When the elbow is used, the latter may be turned upon the neck to swing the nozzle laterally to either side to fertilize rows of plants at the side of the path of the plow. When used in the manner illustrated in Fig. 1, the spout is pointed forward between the rear ends of the mold board and land side of the plow, and the nozzle is turned rearward, so that as the plow opens the furrow, the fertilizer is deposited in the same. In planting potatoes or other plants where tubers or joints are planted, this manner of applying the attachment to a plow is very serviceable, as the furrow into which the seed tubers, shoots or joints are dropped, is fertilized as it is opened, whereupon the discharge of fertilizer is cut off and the planted furrow covered and intermediate furrows plowed, whereupon the gate in the spout may be again opened and another furrow fertilized, and so forth. When the attachment is employed on the ordinary shovel plow, the spout is directed immediately behind the plow blade. When the attachment is employed with an ordinary one-horse cultivator, the spout is directed behind the forward and central tooth, and teeth or blades to the rear of the spout may be arranged to cover the fertilizer. The spout may be swung and adjusted to either side to fertilize a row of plants, and suitable teeth or blades of the cultivator may be adjusted to open the soil in front of the spout and again cover the fertilizer. The nozzle may be pointed forward or rearward according to its relation to the plow or teeth or blades.

In using the term "plow" in the specification, the term is used in its broad sense, applying to any implement in which a blade or blades enters the soil to open or stir it and whether such implement is a turning plow, such as illustrated, a so called "shovel-plow" or "corn-plow", which is the oldest form of cultivator, or a modern cultivator. The term "frame" applies to the single beam of an ordinary plow and a shovel-plow or to the beam or other supporting frame of a cultivator.

Having thus described my invention, what I claim as new and desire to secure by Letters Patent, is:—

1. A fertilizer attachment for cultivators, plows or similar implements, consisting of a hopper provided with means for attaching it upon the frame of the implement, a spout swiveled to the bottom of said hopper, and a gate within the end of said spout controlling the discharge through said spout and having means for adjusting it.

2. A fertilizer attachment for cultivators, plows or similar implements, consisting of a hopper provided with means for attaching it upon the frame of the implement and having an outlet neck upon its bottom, an elbow pipe swiveled upon said neck, a pipe swiveled upon said elbow pipe and having an angularly extending nozzle, and a gate in said nozzle controlling the passage through the same and having means for adjusting it.

3. In a fertilizer attachment for cultivators, plows or similar implements, a hopper provided with means for attaching it upon the frame of the implement, a spout swiveled to the bottom of said hopper, and having an angularly extending nozzle, and a gate within said nozzle controlling the discharge through the same and having means for adjusting it.

WILLIAM F. MARSH.

Witnesses:
B. F. MASTER,
HARRY R. WESCOTT.

---

Copies of this patent may be obtained for five cents each, by addressing the "Commissioner of Patents, Washington, D. C."